United States Patent

Scott et al.

[15] 3,671,012

[45] June 20, 1972

[54] GREASE COMPOSITIONS CONTAINING POLYMERS

[72] Inventors: William P. Scott; Lynn C. Rogers, both of Ponca City, Okla.

[73] Assignee: Continental Oil Company, Ponca City, Okla.

[22] Filed: March 16, 1970

[21] Appl. No.: 20,039

[52] U.S. Cl. ............................. 252/33.4, 252/33, 252/39, 252/40.5, 252/56 R, 252/59, 252/389
[51] Int. Cl. .......................................................... C10m 5/22
[58] Field of Search .................... 252/33, 39, 389, 33.4, 56 R, 252/59, 40.5

[56] References Cited

UNITED STATES PATENTS

| 3,384,586 | 5/1968 | McMillen | 252/21 |
| 3,242,079 | 3/1966 | McMillen | 252/21 |
| 3,372,114 | 3/1968 | Rense | 252/18 |

*Primary Examiner*—Daniel E. Wyman
*Assistant Examiner*—I. Vaughn
*Attorney*—Joseph C. Kotarski, Henry H. Huth, Robert B. Coleman, Jr., Bayless E. Rutherford, Jr. and Carroll Palmer

[57] ABSTRACT

This disclosure concerns compositions comprising a major amount (e.g. at least 75 weight percent) of a thixotropic, grease-like composition consisting essentially of a nonvolatile diluent oil, an oil-soluble dispersing agent, an alkaline earth metal carbonate and a minor amount (e.g. 0.1 to 25 weight percent) of a polymer. The composition is particularly useful as a lubricating grease and also is useful as a rust inhibitor.

15 Claims, No Drawings

GREASE COMPOSITIONS CONTAINING POLYMERS

BACKGROUND

Overbased metal dispersions are well-known. The term "overbased" is used to describe dispersions containing an excess of metal over that required to neutralize the dispersing agent (usually a sulfonic acid). In addition to the term overbased, other terms such as superbased and hyperbased have been used to describe these types of materials. In general these materials are characterized as being relatively non-viscous, i.e., they i.e. fluid and pourable. They are not characterized as having grease-like or thixotropic properties.

U.S. Pat. No. 3,242,079 teaches that certain overbased materials (e.g. those containing dispersed calcium carbonate) can be converted to a thickened composition having the physical properties of a grease. The overbased composition, containing dispersed calcium carbonate, is converted to the grease-like composition by treating it with an active hydrogen compound (e.g. water, water-alcohol mixtures or a lower carboxylic acid).

We have discovered that the addition of a minor amount of a polymer having certain characteristics to a thixotropic, grease-like composition provides an improvement in the physical properties thereof. The thixotropic, grease-like composition comprises a nonvolatile diluent oil, an oil-soluble dispersing agent and an alkaline earth metal carbonate. The improved compositions of our invention have particular utility as a lubricating grease and are also useful as a rust inhibitor.

PRIOR ART

The most pertinent prior art is believed to be U.S. Pat. Nos. 3,384,586 and 3,372,114. U.S. Pat. No. 3,384,586 teaches the addition of a thixotropic, grease-like composition to a polymer. More specifically, this patent teaches a composition comprising a major amount of a polymer and a minor amount of the thixotropic, grease-like composition. This is the opposite of our composition which comprises a major amount of thixotropic, grease-like composition and a minor amount of polymer. The compositions of our invention have properties which are entirely unlike those of the compositions of the patent.

U.S. Pat. No. 3,372,114 teaches that gelled materials useful as a lubricant additive in greases are prepared by contacting (A) a fluid mineral oil solution of a carbonated, basic complex of an alkaline earth metal and an organic carboxylic or sulfonic acid, salt thereof, or carboxylic ester containing at least 12 aliphatic carbon atoms, the complex being characterized by a metal ratio of at least about 4.5, with (B) oxygen at a temperature of about 150° C. to about 300° C. The patent further teaches that in some instances the product is a grease and that small amounts of compatible hydrocarbon resins can be added to the product.

Our composition differs from that taught by the above-discussed patent in at least the following. The polymers used in our composition are "true" polymers and of a different type. Moreover, our composition, prior to the addition of polymers, differs from the composition produced by the process of the patent.

BRIEF SUMMARY OF THE INVENTION

Broadly stated, our invention concerns improved thixotropic, grease-like compositions comprising, in parts by weight:

1. from about 75 to about 99.9 parts of a thixotropic, grease-like composition consisting essentially of:
   a. from about 2 to about 80 parts nonvolatile diluent oil,
   b. from about 5 to about 55 parts oil-soluble dispersing agent, and
   c. from about 1 to about 45 parts alkaline earth metal carbonate, and
2. from about 0.1 to about 25 parts polymer.

Preferably, the polymer of the above-described composition has the following properties:
   a. a low degree of crystallinity,
   b. a molecular weight in the range of from about 3,000 to about 1 million, and
   c. a high solubility in predominantly aliphatic hydrocarbon solvents.

In one aspect, our invention concerns the use of the above-described composition as a lubricating grease.

In another aspect, our invention concerns the use of the above-described composition as a rust inhibitor.

DETAILED DESCRIPTION

Description of the Thixotropic, Grease-like Composition

The thixotropic, grease-like composition, which is a component of the composition of our invention, consists essentially of the following materials in the amounts stated:

| | Parts by Weight | |
| --- | --- | --- |
| | Suitable | Preferred |
| Nonvolatile diluent oil* | 2–80 | 30–70 |
| Oil-soluble dispersing agent* | 5–55 | 6–35 |
| Alkaline earth metal carbonate* | 1–45 | 5–30 |

*The specific nature of these materials will be described hereinafter in connection with the preparation of this composition.

The thixotropic, grease-like composition has the following properties:

An acetic base number of at least 50, preferably at least 135,
Dropping point, ASTM, of at least 480°F.,
Does not flow at 210°F.**

** Another way of stating this property is that the composition has no apparent (i.e. cannot be measured) viscosity at 210° F.

In order to describe more fully the nature of the thixotropic, grease-like composition we will now describe methods of preparing the composition. In so doing we will describe the nature of the materials present in the composition.

Basically, there are two general methods of preparing the thixotropic, grease-like composition. The first method is called simply a "two-step" method. According to this method, a colloidal dispersion of alkaline earth metal carbonate is formed first. The dispersion is then treated, preferably, with a small amount of water in the presence of a small amount of alcohol. The second method is called simply a "one-step" method. According to this method, an admixture is formed of oil-soluble dispersing agent, nonvolatile diluent, alkaline earth metal compound, alcohol, and water. After treating the admixture with $CO_2$, the volatile materials are removed by distillation. The two-step method will be described in detail first:

TWO-STEP METHOD OF PREPARATION

Starting Materials

The charge (or starting) material for this method of preparing the thixotropic, grease-like composition is a colloidal dispersion of an alkaline earth metal carbonate in a suitable diluent and having an acetic base number of at least 50. The term "alkaline earth metal" as used herein refers only to those of this group which are more commonly available, namely, magnesium, calcium, strontium, and barium. Of these, calcium and barium are more suitable, with calcium being preferred.

While we have used the term alkaline earth metal carbonate, it may be well to mention that although carbonate is the predominant anion, traces of other anions, e.g. hydroxide, oxide, and alkoxide can be present. This is due to the fact that many processes of preparing dispersions of alkaline earth metal carbonates prepare the carbonate by carbonation of an alkaline earth metal hydroxide, oxide, or alkoxide.

Many processes are known for preparing colloidal dispersions of alkaline earth metal carbonates. Also, several processes are known for preparing colloidal dispersions of alkaline earth metal carbonates, wherein the metal carbonate is formed in situ in the presence of the dispersing agent. It is characteristic of the products prepared by the in situ method that they have a uniform and small (i.e., 0.25 micron or less, and usually 0.10 micron or less) particle size.

The following U.S. patents are concerned with the preparation of colloidal dispersions, wherein the alkaline earth metal compound is formed in situ: U.S. Pat. No. 3,150,089, to Mack W. Hunt, which issued Sept. 22, 1964 and is entitled "Highly Basic Magnesium-Containing Additive Agent"; U.S. Pat. No. 3,150.088, to Mack W. Hunt et al, which issued Sept. 22, 1964 and is entitled "Highly Basic Calcium-Containing Additive Agent"; U.S. Pat. No. 2,956,018 to Robert L. Carlyle et al, which issued Oct. 11, 1960 and is entitled "Metal Containing Organic Compositions and Method of Preparing the Same"; U.S. Pat. No. 2,937,991, to Robert L. Carlyle, which issued May 24, 1960 and is entitled "Method of Dispersing Calcium Carbonate in a Non-Volatile Carrier"; and U.S. Pat. No. 2,895,913, to Robert L. Carlyle et al, which issued on July 21, 1959 and is entitled "Magnesium Containing Organic Compositions and Method of Preparing the Same."

The colloidal dispersions which are used as a starting material consist essentially of a nonvolatile diluent, an oil-soluble dispersing agent, and an alkaline earth metal carbonate. These materials are present in the following range:

|  | Parts by Weight | |
| --- | --- | --- |
|  | Suitable | Preferred |
| Nonvolatile diluent | 2–80 | 30–70 |
| Dispersing agent | 5–55 | 6–35 |
| Alkaline earth metal carbonate | 1–45 | 5–30 |

In addition to the nonvolatile diluent, oil-soluble dispersing agent, and basic metal compound, the colloidal dispersions may contain minor amounts of the alcohol which is employed in manufacturing the colloidal dispersion, and of the metal-containing intermediate which may be employed in manufacturing the colloidal dispersion.

A wide variety of nonvolatile diluents are suitable in the colloidal dispersions used as the starting material. The principal requisite desired in the nonvolatile diluent is that it will act as a solvent for the dispersing agent which is used. Examples of nonvolatile diluents which can be used include mineral lubricating oils obtained by any of the conventional refining procedures; liquid synthetic lubricating oils; vegetable oils, such as corn oil, cotton seed oil, and castor oil; animal oils, such as lard oil and sperm oil. Of the oils in the preceding examples, the mineral lubricating oils are preferred.

A variety of oil-soluble dispersing agents are suitable in the colloidal dispersions which are used in preparing the product used in my invention. Generic examples of suitable dispersing agents include oil-soluble sulfonic acids, carboxylic acids, and the metal salts thereof. The preferred dispersing agents for preparing the grease-like product used in my invention are the oil-soluble sulfonic acids and metal sulfonates.

The term "metal" as used in "metal sulfonates," refers to those metals which are conventionally used to prepare the metal sulfonates of commerce. This includes metal sulfonates wherein the metal is sodium, potassium, magnesium, calcium, and barium. The more suitable sulfonates are those wherein the metal is calcium or barium. Preferably, the metal of the metal sulfonate is the same as the metal of the basic metal compound.

The term "oil-soluble sulfonates," as used herein, refers to those sulfonates wherein the hydrocarbon portion of the molecule has a molecular weight in the range of about 300 to about 1,000. Preferably, this molecular weight is in the range of about 370 to about 700. These oil-soluble sulfonates can be either synthetic sulfonates or the so-called mahogany or natural sulfonates. The term "mahogany sulfonates" is believed to be well understood, since it is amply described in the literature. The term "synthetic sulfonates" refers to those sulfonates which are derived from sulfonation feedstocks which are prepared synthetically. The synthetic sulfonates include alkyl sulfonates and alkaryl sulfonates. The alkaryl radical can be derived from benzene, toluene, ethyl benzene, xylene isomers, or naphthalene. Preferably, the alkyl groups are branched chain.

Mixtures of sulfonates derived from alkaryl hydrocarbons having straight-chain alkyl groups and alkaryl hydrocarbons having branched-chain alkyl groups, and wherein the amount of sulfonate derived from branched-chain alkaryl hydrocarbons is at least 40 percent by weight, are particularly suitable. Preferably, the amount of sulfonate derived from branched chain alkaryls is at least 60 percent by weight.

An example of an oil-soluble alkaryl sulfonate (a synthetic sulfonate) which has been particularly useful in preparing colloidal dispersions is the material known as postdodecylbenzene sulfonate. Postdodecylbenzene is a bottoms product of the manufacture of dodecylbenzene. The alkyl groups of postdodecylbenzene are branched chain. Postdodecylbenzene consists of monoalkylbenzenes and dialkylbenzenes in the approximate mole ratio of 2:3 and has typical properties as follows:

| Specific gravity at 38°C. | 0.8649 |
| --- | --- |
| Average molecular weight | 385 |
| Percent sulfonatable | 88 |
| A.S.T.M. D–158 Engler: | |
| I.B.P., °F | 647 |
| 5 °F | 682 |
| 50 °F | 715 |
| 90 °F | 760 |
| 95 °F | 775 |
| F.B.P. °F | 779 |
| Refractive index at 23°C | 1.4900 |
| Viscosity at: | |
| −10°C, centipoises | 2800 |
| 20 cetipoises | 280 |
| 40 cetipoises | 78 |
| 80 cetipoises | 18 |
| Aniline point, °C | 69 |
| Pour point, °F | −25 |

An example of another oil-soluble synthetic alkaryl sulfonate, which is particularly useful for preparing colloidal dispersions, is the sulfonate derived from a sulfonation feedstock known as "dimer alkylate." "Dimer alkylate" has branched-chain alkyl groups as does postdodecylbenzene. Briefly described, dimer alkylate is prepared by the following steps:

1. dimerization of a suitable feedstock, such as cat poly gasoline,
2. alkylation of an aromatic hydrocarbon with the dimer formed in stop (1). Preferably, the dimerization step uses a Friedel-Crafts alkylation sludge as the catalyst. This process and the resulting product are described in U.S. Pat. No. 3,410,925.

An example of still another oil-soluble synthetic alkaryl sulfonate, which is particularly useful for preparing colloidal dispersions, is the sulfonate derived from a sulfonation feedstock which I refer to as "NAB Bottoms." NAB Bottoms are predominantly di-n-alkaryl, wherein the alkyl groups contain from eight to 18 carbon atoms. They distinguish primarily from the preceding sulfonation feedstocks in that they are straight-chain and contain a large amount of disubstituted material. The process of preparing these materials and the resulting product are described in application Ser. No. 521,794 filed Jan. 20, 1966 and now abandoned, and having the same assignee as the present application. Another process of preparing a di-n-alkaryl product is described in application Ser. No. 529,284, filed Feb. 23, 1966 and now abandoned, and having the same assignee as the present application.

Mixtures of sulfonates derived from "dimer alkylate" and "NAB Bottoms" are suitable for preparing the grease-like compositions used in our invention.

In order to make our disclosure even more complete, U.S. Pat. No. 3,410,925 and application Ser. Nos. 521,794 and 529,284 are made a part of this disclosure.

Other sulfonates which can be used in the colloidal dispersion employed as a starting material include, for example, mono- and poly-wax substituted naphthalene sulfonates, dinonyl naphthalene sulfonates, diphenyl ether sulfonates, naphthalene disulfide sulfonates, diphenyl amine sulfonates, dicetyl thianthrene sulfonates, dilauryl betanaphthol sulfonates, dicapryl nitro-naphthalene sulfonates, unsaturated paraffin wax sulfonates, hydroxy substituted paraffin wax sulfonates, tetraamylene sulfonates, mono- and poly-chloro-substituted paraffin wax sulfonates, nitrosoparaffin wax sulfonates; cycle-aliphatic sulfonates, such as lauryl-cyclohexyl sulfonates, mono- and poly-wax substituted cyclohexyl sulfonates, and the like.

In addition, it is to be understood that the metal salts of the preceding sulfonates can be formed in situ during preparation of the colloidal dispersion by neutralization of the corresponding sulfonic acid.

Suitable carboxylic acids which can be used in preparing the colloidal dispersion used as a starting material include naphthenic acids, such as the substituted cyclopentane monocarboxylic acids, the substituted cyclohexane monocarboxylic acids and the substituted aliphatic polycyclic monocarboxylic acids containing at least 15 carbon atoms. Specific examples include cetyl cyclohexane carboxylic acids, dioctyl cyclopentane carboxylic acids, dilauryl decahydronaphthalene and stearyloctahydro indene carboxylic acids and the like and oil-soluble salts thereof. Suitable oil-soluble fatty acids are those containing at least eight carbon atoms. For producing the colloidal dispersion in liquid form, I prefer fatty acids which are liquids at ambient temperatures down to about 15°C. Specific examples include 2-ethyl hexanoic acid, pelargonic acid, oleic acid, palmitoleic acid, linoleic acid and ricinoleic acid. Naturally occurring mixtures of predominantly unsaturated fatty acids, such as tall oil fatty acids, are particularly suitable.

In addition, it is to be understood that the metal salts of the preceding carboxylic acids can be formed in situ during preparation of the colloidal dispersion by neutralization of the corresponding carboxylic acid.

Process Conditions (Two-step method)

The thixotropic, grease-like composition used to prepare the composition of our invention can be prepared by treating the colloidal dispersion with a small amount of water in the presence of a small amount of an alcohol. From a practical viewpoint, the amount of water which is used should be at least about 3 percent, preferably about 7 percent, by weight, based on the colloidal dispersion. Preferably, the amount of water should not be above 12 percent, and usually not above 20 percent, by weight, based on the colloidal dispersion. (Larger amounts can be used conceivably, but no advantage results therefrom. Also, if an extremely long reaction time can be tolerated, an amount of water less than 3 percent might be used.) It should be noted that increasing the amount of water from 4 or 5 percent to about 7 or 8 percent provides a pronounced increase in rate of reaction.

The amount of alcohol which is used is in the range of about 0.5 to about 10 percent, preferably from about 2 to about 5 percent, by weight, based on the colloidal dispersion. These aforementioned amounts of alcohol include the residual alcohol present in the colloidal dispersion which runs from about 0.5 percent to about 3 percent by weight, usually.

It is apparent from the preceding that some colloidal dispersions have sufficient residual alcohol so that additional alcohol is not required. Sometimes, the use of additional alcohol will accelerate the reaction rate. Also, we have found that the amount of alcohol required varies with the type of dispersing agent, in that some dispersing agents require more alcohol than others. Furthermore, the alcohol which is added does not have to be the same species of alcohol which is present as the residual alcohol.

A wide variety of alcohols can be used in the conversion of the colloidal dispersion to the thixotropic, grease-like composition used in our invention. Examples of suitable alcohols include the $C_1$-$C_{10}$ alkanols, the monoether alcohols of ethylene glycol containing up to eight carbon atoms, and the monoether alcohols of diethylene glycols containing up to eight carbon atoms. Preferably, the alcohols have boiling points of at least about that of water. Examples of suitable alcohols include methanol, ethanol, propanol, isobutanol, pentanol, hexanol, octanol, decanol, 2-methoxy ethanol, and 2-ethoxy ethanol. Of these, isobutanol and 2-methoxy ethanol are preferred.

As is apparent from the preceding discussion, an important feature of the process of preparing the grease-like composition is the use of a combination of water and an alcohol to effect a modification reaction. By "modification reaction" is meant the change from a fluid, clear colloidal dispersion to a viscous, tacky material.

In the preparation of the composition, heat is applied to the admixture containing colloidal dispersion, water, alcohol (and, possibly, volatile solvent or nonvolatile diluent oil). The heat is applied until the modification reaction occurs which is apparent by a rapid change in viscosity of the reaction admixture. The modification reaction occurs at a temperature slightly above 170° F. Usually a temperature of 190°–210° F is sufficient to cause the reaction to go to completion rapidly.

When the composition of our invention is to be used as a rust inhibitor, it is often convenient to use a solution of the composition in a volatile solvent. When the composition is to be used thusly, it is often convenient to prepare the thixotropic, grease-like composition in the presence of the volatile solvent. The polymer is then added to the solution. When the "modification reaction" is conducted in the presence of the volatile solvent, the occurrence of the reaction is still visible in that the viscosity changes and the solution changes from a bright, clear solution to a hazy or cloudy solution. The temperature employed and the total amount of heat used are not critical in the two-step method.

ONE-STEP METHOD OF PREPARATION

Starting Materials

The nature and amounts of the starting materials, which are used to prepare the thixotropic, grease-like composition which is used in the compositions of our invention, are shown in the following table:

| Material | Parts by Weight Suitable | Preferred |
|---|---|---|
| Nonvolatile Diluent | 2–80 | 5–30 |
| Dispersing Agent | 2–65 | 5–30 |
| Alkaline Earth Metal (Present as Alkaline Earth Metal Carbonate) | 2–40 | 10–30 |
| Water | 1–6 | 2–4 |
| Alcohol | 10–40 | 20–30 |
| Volatile Solvent (optional*) | 0–60 | 25–45 |

*Previously, in discussing the process conditions for the two-step method, we stated that a volatile solvent, which is used in applying the composition as a rust inhibitor, can be present during the preparation. Preferably, however, in the two-step method the grease-like composition is prepared first and dissolved in the volatile solvent. In the one-step method we have found no advantage to first preparing the grease-like composition and then dissolving it. In view of this having the volatile solvent present during the preparation of the composition is a matter of choice dependent on other factors. The nature of the volatile solvent is described hereinafter.

It should be emphasized that the above-stated ranges apply solely to the one-step process of preparing the grease-like composition. The ranges differ from those given hereinafter for the grease-like composition per se, primarily, due to the inclusion of volatile materials. For this reason the ranges are stated solely to illustrate the process. Insofar as the above-stated ranges differ from those given for the grease-like composition per se, our invention is limited only to the ranges stated for the composition.

Suitable and preferred nonvolatile diluent, dispersing agent and alkaline earth metal are the same as described previously in connection with the two-step method.

An alkaline earth metal carbonate, which is formed in situ, is used in the process. In forming the alkaline earth metal carbonate, an admixture is prepared of alkaline earth metal basic compound, selected from the group consisting of oxides, hydroxides, and alcoholates, dispersing agent, nonvolatile diluent, and alcohol. The admixture is then treated with $CO_2$ to form the carbonate. Alternatively and preferably, the alkaline earth metal carbonate is formed by adding an alcoholic slurry of the alkaline earth metal basic compound to an admixture of the other materials. The total admixture is then treated with $CO_2$ to form the carbonate.

Suitable alcohols for use in the "one-step" process include $C_1$–$C_{10}$ alkanols, the monoether alcohols of ethylene glycol containing up to eight carbon atoms, and the monoether alcohols of diethylene glycol containing up to eight carbon atoms. Examples of suitable alcohols include methanol, ethanol, propanol, isobutanol, pentanol, hexanol, octanol, decanol, 2-methoxy ethanol, and 2-ethoxy ethanol. The preferred alcohols are the $C_1$–$C_{10}$ alkanols, with the $C_1$–$C_3$ alkanols being more preferred.

PROCESS CONDITIONS

In carrying out the one-step method, the oil soluble dispersing agent (whether pre-formed, or formed in situ), nonvolatile diluent and alcohol-alkaline earth metal basic compound slurry are intimately admixed preparatory to carbonation. The water component of the mixture may be added at any time prior to the final controlled heating step, and may be added at different times in two or more increments, if desired. The same is true of any alcohol which is added in addition to that introduced with the slurry. In the case of the water, however, it is preferred to add the entire amount of water at the outset and prior to carbonation since thicker products appear to be yielded when this procedure is followed.

In carrying out the carbonation of the mixture to form the carbonate, at least about 1.5 moles of carbon dioxide must be introduced to the mixture for each mole of alkaline earth metal present. In addition, the gas necessary to complete carbonation (as described) must be introduced to the mixture within 75 minutes in order to obtain the high viscosity grease-like product sought, and it is preferred that this amount be introduced at a sufficient rate to achieve completion of carbonation and formation of the complex within from 20 to 40 minutes.

The carbon dioxide required may be introduced into the mixture by blowing or bubbling the gas through the mixture, or by immersing dry ice in the mixture. The reaction is exothermic and its progress can be followed by observation of the change in temperature of the reaction mixture. It is preferred that the temperature be retained below about 50° C. during carbonation.

Upon completion of carbonation, the mixture, which then contains the oil-soluble dispersing agent, the nonvolatile carrier material, and the alkaline earth metal carbonate complex resulting from carbonation is subjected to a controlled heating step. Between the carbonation procedure and the heating step, water and/or alcohol may be added to the mixture in order to bring the total content of these two components in the mixture up to that which has been hereinbefore described as the operative requirements in this respect. The heating step with which the one-step method is concluded is quite important, and the manner in which it is conducted determines whether the desired high consistency low penetration grease-like compositions are yielded, or whether a fluid dispersion of the general type described in U.S. Pat. Nos. 2,956,018 and 2,861,951 to Carlyle and also in U.S. Pat. Nos. 3,150,088 and 3,027,325 to McMillen are formed.

In the final heating step of the process, two objectives are sought by the heating. First, the light solvents must be stripped from the mixture, except, perhaps, for small amounts of water and alcohol and such light hydrocarbon carrier material as it is desired to have remain in the final product for purposes of enhancing the ease of processing. Thus, the heating will remove substantially all of the alcohol and water which are not consumed in the grease producing reaction, and any very light hydrocarbon solvents, such as hexane, which are incorporated in the mixture in order to facilitate the carbonation of the alkaline earth metal base compound.

The second function of the heating is to supply the heat of reaction which is necessary to effect the conversion of the mixture to a high consistency grease-like composition.

To then describe the specific parameters which are critical in the heating of the heterogeneous mixture which exists after carbonation in order to form the described grease-like compositions, it is necessary that the mixture be heated to a temperature above about 50° C.

After reaching the threshold temperature of about 50° C. for effecting the conversion reaction, it is then desirable to gradually increase the temperature of the reaction mixture to above 100° C., and preferably ultimately to about 160° C. This is because water in the mixture commences to be stripped or driven off at 100° C., and the total processing time becomes unacceptably long when temperatures exceeding this level are never attained during the final heating step. On the other hand, it is critical to the formation of the desired grease products that the temperature zone of 50° to 100° C. not be traversed too rapidly. The effect of increasing the temperature of the mixture at an excessive rate is to drive an excessive amount of the water from the mixture before it has had an opportunity to enter into the reaction necessary to convert the mixture to grease. From this it follows that the greater the amount of water in the mixture within the operative range of water content hereinbefore described, the higher may be the rate at which the temperature is raised from 50° to 100° C.

A definite relationship exists between the amount of water in the heated mixture and the time required to traverse the temperature zone of from 50° to 100° C. For example, where the minimum operative quantity of water is present in the mixture at the inception of the final heating step (that is, 0.25 moles of water per mole of overbasing alkaline earth metal preset), the time within which the mixture must be maintained between 50° and 100° C. is at least 4.5 hours. This time period decreases in a fairly regular uniform fashion as the amount of water present in the mixture with respect to the amount of alkaline earth metal present increases. Thus, when a water level of about 2.5 moles of water per mole of alkaline earth metal is reached, a time period of only about 45 minutes in the temperature range of 50° to 100° C. is required in order to effect the desired conversion to the grease-like product. At this and higher water levels, the time requirement to effect the desired conversion drops off very sharply so that the reaction mixture may be heated from 50° to 100° C. at as rapid rate as may be desired. This relationship between the transition time for elevating the temperature of the reaction mass from 50° to 100° C. in instances where the water content of the reaction mixture is in the range of from about 0.25 moles of water per mole of alkaline earth metal (present in an overbasing capacity) to about 2.5 moles of water per mole of the metal can be approximated by the expression:

$$t = 0.75 + 1.7 \times (2.5 - m)$$

where $t$ equals the time in hours within which the mixture must be retained in the temperature range of between 50° and 100° C. and $m$ is the number of moles of water present in the mixture per mole of alkaline earth metal present in the mixture in an overbasing capacity.

Where the reaction mixture is heated too rapidly to above 100° C., the water appears to be stripped from the mixture too fast to permit the completion of reaction. The result then is that there is formed a homogeneous dispersion of alkaline earth metal carbonate which is quite fluid and is similar to the lubricating oil additives which are yielded by the processes described in U.S. Pat. Nos. 2,956,018 and 2,861,951 to Carlyle and also in U.S. Pat. No. 3,150.088 to Hunt.

The information of the desired grease-like product is clearly evidenced by the marked and rapid change in the observable physical properties of the mixture. The most striking change, perhaps, is in the viscosity of the mixture, which increases rapidly as the conversion to grease-like product occurs. The grease-like product is tacky and opaque and is macroscopically homogeneous. It is highly basic in terms of its acetic base number. (This term is well-known in the art, being described in U.S. Pat. No. 3,150,088.)

As the starting mixture undergoes conversion or modification to yield the grease-like product, it will often be desirable to add a volatile solvent to the mixture in order to maintain its viscosity within a manageable range.

In the heating step, it is not necessary to remove all of the water and alcohol from the mixture, particularly where the product is to be used as a rust inhibitor.

It is to be understood that the one-step method of preparing the grease-like composition is not part of my invention. This method is disclosed and claimed in application Ser. No. 727,719 filed May 8, 1968 and now abandoned.

THE POLYMER

The term "polymer" as used herein includes certain copolymers which meet the specified requirements. Suitable polymers for use in our invention have the following properties:

a. a low degree of crystallinity; i.e., less than 50 percent, preferably less than 25 percent, crystallinity,
b. a molecular weight in the range of from about 3,000 to about 1 million,
c. a high solubility in predominantly aliphatic hydrocarbon solvents, such as hexane, n-decane, Stoddard solvent, kerosene and petroleum lubricating oils. Polymers meeting the above-listed description are often termed atactic or amorphous.

Examples of suitable types of polymers include low molecular weight or low density polyethylene, amorphous polypropylene, polyisobutylene, polyterpenes; copolymers of the foregoing with vinyl monomers, such as vinyl chloride, and vinyl esters, such as vinyl acetate; polyacrylic acids, and polymethacrylic acids.

Specific examples of suitable polymers include the following:

| Supplier | Tradename | Polymer Type |
| --- | --- | --- |
| Dow | Zetafax | Ethylene-isobutyl acrylate |
| DuPont | Elvax | Ethylene-vinyl acetate |
| DuPont | Alathon | Low molecular weight polyethylene |
| Eastman | Eastobond | Polyolefin hot melt adhesive |
| Eastman | Epolene | Amorphous polyethylene |
| Goodyear | "Wing Tack" | Polyterpene |

Particularly suitable polymers include polyterpenes, ethylene-vinyl acetate copolymers, and ethylene-isobutyl acrylate copolymers. Preferred polymers are ethylene-vinyl acetate copolymers and ethylene-isobutyl acrylate copolymers.

Since there are many issued patents describing the preparation and properties of the above-described polymers, it is not considered necessary to include these details herein. This is particularly the case with the ethylene-vinyl acetate copolymers and ethylene-isobutyl acrylate copolymers.

Relative Amounts of Polymer and Thixotropic, Grease-like Composition in our Composition

| | Parts by Weight | |
| --- | --- | --- |
| | Polymer | Thixotropic Composition |
| Suitable | 0.1–25 | 75–99.9 |
| Preferred | 0.5–5 | 95–99.5 |

Preparation of Blend of Polymer and Thixotropic, Grease-like Composition

No particular technique is required to prepare the blend of polymer and thixotropic, grease-like composition. This is particularly true since usually the amount of polymer used is relatively small. After adding the required amount of polymer to the thixotropic, grease-like composition, preferably slowly in incremental amounts, the admixture is stirred sufficiently to provide a homogeneous composition.

In order to disclose the nature of the present invention the following examples, both illustrative and comparative, will be given. It is to be understood, however, that the invention is not to be limited to the specific conditions or details set forth in these examples except insofar as such limitations are specified in the appended claims. Parts are by weight.

EXAMPLE 1

This example illustrates the improvement in con-sistency obtained by adding a small amount of polymer to the thixotropic, grease-like composition. A. The colloidal dispersion of calcium carbonate used in this example had the following composition:

30 percent calcium sulfonate
43 percent nonvolatile diluent oil (170 pale oil)
27 percent calcium carbonate * * The material had an acetic base number of about 300.

One hundred parts of the colloidal dispersion of calcium carbonate were heated to 180° F. in a mixer whereupon 10 parts of water and 0.5 parts of methoxy ethanol were added. The admixture was stirred and heated for about 30 minutes at a temperature of 210° to 220° F., after which the volatile solvents were removed by heating to 310° F. The resulting product was a thixotropic, grease-like composition having an ASTM penetration of 131.

B. Using the materials described above the process was repeated with the exception that following solvent removal, 1 part of a high density polyethylene (duPont "Alathon" 7516) was added and the total admixture was heated to 500° F. to effect solution of the polymer. The resulting product was a thixotropic, grease-like composition having an ASTM penetration of 89, which represents a 32 percent improvement in con-sistency over Example 1–A.

Of course, additional nonvolatile diluent oil can be added to produce a grease having a lower consistency. The net result is that the use of the polymer provides an increased yield in the amount of grease.

EXAMPLE 2

This example illustrates the improvement obtained by adding various "Elvax" copolymers to the thixotropic, grease-like composition.

Using the procedure and materials shown in Example 1, with the exception that additional nonvolatile diluent oil was used, a thixotropic, grease-like composition was prepared. This composition is shown on No. 1 in Table 1, which follows. To the base composition there was added 1 percent (wt.) of various DuPont "Elvax" copolymers. These compositions are shown as numbers 2, 3, and 4 in Table I.

TABLE I

| No. | Colloidal Dispersion of CaCO₃, g. | Nonvolatile diluent oil (1), g. | DuPont "Elvax" No. 460(2) | EP3652(3) | 40(4) | Penetration ASTMD217 |
|---|---|---|---|---|---|---|
| 1 | 54.8 | 45.2 | — | — | — | 275 |
| 2 | 54.8 | 45.2 | 1.0 | — | — | 185 |
| 3 | 54.8 | 45.2 | — | 1.0 | — | 189 |
| 4 | 54.8 | 45.2 | — | — | 1.0 | 195 |

(1) a solvent-refined, paraffinic bright stock oil.
(2) contains 17–19% vinyl acetate and has a melt index of 2.1–2.9.
(3) contains 28% vinyl acetate.
(4) contains 39–42% vinyl acetate and has a melt index of 45–65.

EXAMPLE 3

This example illustrates the improvement in extreme pressure (EP) properties obtained by adding various polymers to the thixotropic, grease-like composition. The test method used to measure EP properties was the Four-Ball test (ASTM Method D–2596). The measurements obtained, together with the meaning of each, on the Four-Ball test are shown below.

Wear - a measure of the wear scar in millimeters lower numbers denote an improvement.

Weld - a measure of the weld point or ability of the lubricant to prevent metal seizure. A higher weld point indicates an improvement.

MHL - abbreviation for Mean Hertz Load, which is an index or relative ranking given to lubricants. Lubricants having high MHL's are considered superior to lubricants having low MHL's.

The greases used in this example were prepared using the procedure and materials of Example 1. As in Example 2, additional nonvolatile diluent oil was added to adjust the consistency.

The compositions subjected to the Four-Ball Test were as follows.

1 - Same as number 1 in Example 2
2 - Similar to No. 3 of Example 2 but containing 0.8 percent "Elvax" EP–3652. Additional nonvolatile diluent oil was added to bring the penetration to 275, the same as No. 1 of this example. The composition contained the following:
Parts by weight
43.4 - colloidal dispersion of CaCO₃
55.8 - nonvolatile diluent oil
0.8 - "Elvax" EP 3652
3 - This composition contained the following:
Parts by weight
45.7 - colloidal dispersion of CaCO₃
50.3 - nonvolatile diluent oil - similar to that in Example 2 but containing waxy and tarry residues. In other words, it was a nonrefined lube crude residuum.
2.3 - lead naphthenate
1.1 - "Paratac" (a polyisobutylene)
0.3 - "Ortholeum" 300 (oxidation inhibitor)
4 - This composition contained the following:
Parts by weight
45.7 - colloidal dispersion of CaCO₃
50.3 - Nonvolatile diluent oil (same as in 3)
1.0 - DuPont "Alathon" (high density polyethylene)
2.3 - lead naphthenate
1.1 - "Paratac"
0.3 - "Ortholeum" 300
5 - This composition contained the following:
Parts by weight
45.7 - colloidal dispersion of CaCO₃
50.3 - nonvolatile diluent oil
1.0 - "Elvax" EP 3652
2.3 - lead naphthenate
1.1 - "Paratac"
0.3 - "Ortholeum" 300

The Four-Ball Test Results are shown in Table II below.

TABLE II

| Grease No. | Penetration ASTM D-217 | Wear | 4-Ball Weld | MHL |
|---|---|---|---|---|
| 1 | 275 | 0.76 | 340 | 52.3 |
| 2 | 275 | 0.42 | 500 | 43.0 |
| 3 | 350 | 0.5 | 400 | 46.9 |
| 4 | 255 | 0.57 | 560 | 65.5 |
| 5 | 255 | 0.46 | 560 | 57.7 |

EXAMPLE 4

This example illustrates the one-step method of preparing the colloidal dispersion of calcium carbonate, which is used to prepare the thixotropic, grease-like composition.

The methoxy ethanolic solution of Ca methoxy ethoxide was prepared in accordance with the procedure described in U.S. Pat. No. 3,150,088.

The sulfonic acid solution employed in this example contained 27 percent (by wt.) mixed sulfonic acids, 60 percent (by wt.) n-hexane and 13 percent (by wt.) nonvolatile mineral oil (pale oil). The mixed sulfonic acids contained 60 percent (by wt.) oil-soluble sulfonic acids derived from "dimer alkylate" and 40 percent (by wt.) oil-soluble sulfonic acids derived from "NAB" Bottoms. Both "dimer alkylate" and "NAB" Bottoms have been described in the foregoing.

To a one-liter flask were added:
150 g. - sulfonic acid solution
49 g. - 100 pale oil The admixture was heated to 35° C. and the sulfonic acid was neutralized by adding 31 grams of a methoxy ethanol solution of Ca methoxy ethoxide-carbonate, containing 6.95 percent Ca. The temperature was adjusted to 40° C. and the following solutions were added concurrently at constant rates:

252 g. - methoxy ethanol solution of Ca methoxy ethoxide-carbonate (containing 6.95 percent Ca)
59.4g. - solution containing:
29.3 percent methoxy ethanol
14.2 percent methanol
56.5 percent water After the addition, the admixture was heated at reflux temperature for 5 hours. Then 170 grams of Stoddard solvent were added and the major portion of the solvents were removed by heating to 150° C.

Removal of the Stoddard solvent from a portion of the product resulted in a thixotropic, grease-like composition having an ASTM penetration of 187.

Related application Ser. No. 20,038, filed the same date as the present application contains data showing the physical properties of the following compositions: the composition of the present application which contains a major amount of thixotropic, grease-like composition and a minor amount of polymer and the composition taught by McMillen in U.S. Pat. No. 3,384,586 which contains a major amount of polymer and a minor amount of thixotropic, grease-like composition.

The invention having thus been described, what is claimed to be secured by letters patent is:

We claim:

1. An improved grease composition comprising, in parts by weight:
   I. from about 75 to about 99.9 parts of a thixotropic grease-like composition consisting essentially of:
      a. from about 30 to about 70 parts nonvolatile diluent oil,
      b. from about 6 to about 35 parts alkaline earth metal sulfonate,
      c. from about 5 to about 30 parts alkaline earth metal carbonate, and
   II. from about 0.1 to about 25 parts of polymer selected from the group consisting of polyterpenes, ethylene-vinyl acetate copolymers, and ethylene-isobutyl acrylate copolymers, said polymer having the following properties: a crystallinity of less than 50 percent, a molecular weight in the range of from about 3,000 to about 1 million, and a high solubility in predominantly aliphatic hydrocarbon solvents.

2. The grease composition of claim 1 wherein the nonvolatile diluent oil is selected from the group consisting of synthetic lubricating oils and mineral lubricating oils.

3. The grease composition of claim 2 wherein the polymer is a polyterpene.

4. The grease composition of claim 2 wherein the polymer is an ethylene-vinyl acetate copolymer.

5. The grease composition of claim 2 wherein the polymer is an ethylene-isobutyl acrylate copolymer.

6. The grease composition of claim 2 wherein it contains from about 95 to about 99.5 parts thixotropic, grease-like composition and from about 0.5 to about 5 parts polymer.

7. The grease composition of claim 6 wherein the polymer is selected from the group consisting of polyterpenes, ethylene-vinyl acetate copolymers and ethylene-isobutyl acrylate copolymers.

8. The grease composition of claim 7 wherein the polymer is a polyterpene.

9. The grease composition of claim 7 wherein the polymer is an ethylene-vinyl acetate copolymer.

10. The grease composition of claim 7 wherein the polymer is an ethylene-isobutyl acrylate copolymer.

11. An improved grease composition comprising, in parts by weight:
   I. from about 75 to about 99.9 parts of a thixotropic, grease-like composition consisting essentially of:
      a. from about 30 to about 70 parts mineral lubricating oil,
      b. from about 6 to about 35 parts calcium salt of an oil-soluble sulfonic acid,
      c. from about 5 to about 30 parts calcium carbonate, and
   II. from about 0.1 to about 25 parts of polymer selected from the group consisting of polyterpenes, ethylene-vinyl acetate copolymers, and ethylene-isobutyl acrylate copolymers, said polymer having the following properties: a crystallinity of less than 50 percent, a molecular weight in the range of from about 3,000 to about 1 million, and a high solubility in predominantly aliphatic hydrocarbon solvents.

12. The grease composition of claim 11 wherein it contains from about 95 to about 99.5 parts thixotropic, grease-like composition and from about 0.5 to about 5 parts polymer.

13. The grease composition of claim 12 wherein the polymer is a polyterpene.

14. The grease composition of claim 12 wherein the polymer is an ethylene-vinyl acetate copolymer.

15. The grease composition of claim 12 wherein the polymer is an ethylene-isobutyl acrylate copolymer.

* * * * *